(No Model.)
W. P. YOUNG.
CAR FENDER.
No. 560,075. Patented May 12, 1896.
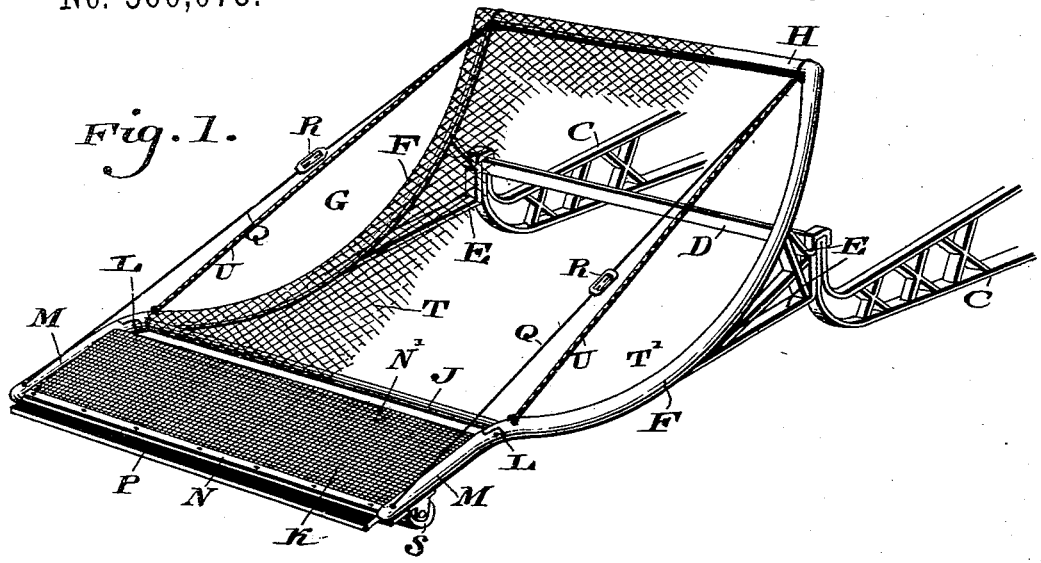
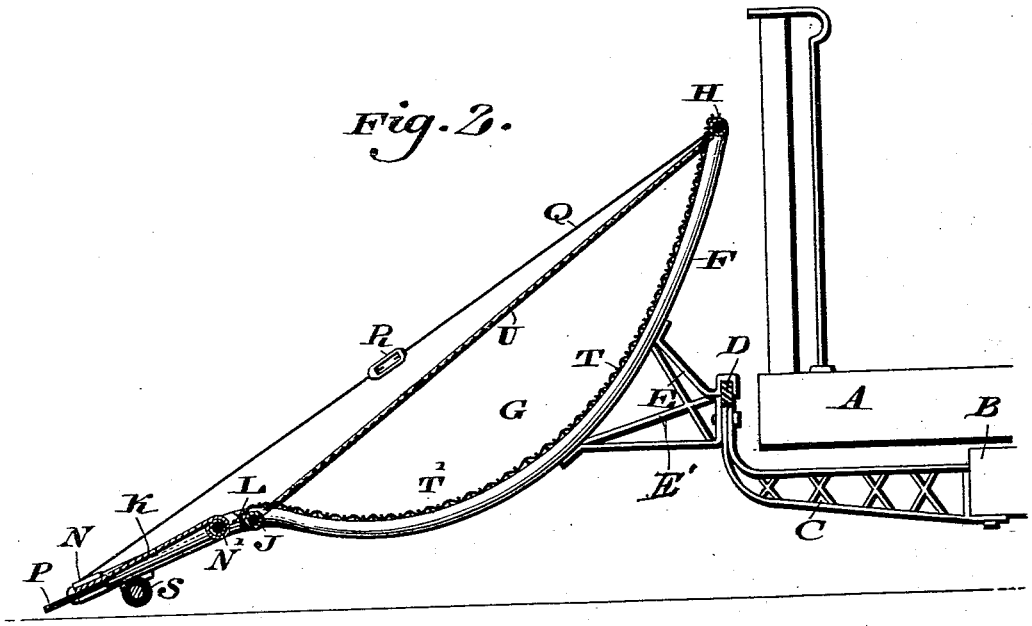
WITNESSES:
P. H. Nagle.
L. Douville.
INVENTOR
William P. Young,
BY Joshua ~~~~~~~
ATTORNEY.

UNITED STATES PATENT OFFICE.

WILLIAM P. YOUNG, OF POTTSTOWN, PENNSYLVANIA.

CAR-FENDER.

SPECIFICATION forming part of Letters Patent No. 560,075, dated May 12, 1896.

Application filed October 15, 1895. Serial No. 565,813. (No model.)

*To all whom it may concern:*

Be it known that I, WILLIAM P. YOUNG, a citizen of the United States, residing at Pottstown, in the county of Montgomery, State of Pennsylvania, have invented a new and useful Improvement in Car-Fenders, which improvement is fully set forth in the following specification and accompanying drawings.

My invention consists of a novel construction of car-fender, which is adapted to be mounted on suitable trusses, which are attached to the trucks of a car, provision being thereby made for reducing to a minimum the vibration or oscillation of the fender over the structures now in use, in which the fender is mounted directly upon the car or dashboard and has the vibrations of the car thus imparted thereto.

It also consists in providing the forward portion of the fender with a scoop of novel construction, and in further providing means whereby the height of the same from the track can be readily adjusted according to requirements.

It further consists of novel details of construction, all as will be hereinafter set forth.

Figure 1 represents a perspective view of a car-fender embodying my invention. Fig. 2 represents a side elevation of the same, a portion of the fender being shown in section, showing also the manner of attaching the fender to the car-truck.

Similar letters of reference indicate corresponding parts in the two figures.

Referring to the drawings, A designates the platform of a car, and B designates a portion of the trucks upon which said car is mounted.

C designates trusses which have one end attached to said trucks B, while the forward end of each in the present instance is turned upwardly and braced and connected by means of the cross-rod D.

E designates arms which extend rearwardly from and are rigidly connected with the curved arms F of the fender proper, G. The upper one of said arms E has a hook at its rear end for engagement with the cross-rod D, and the lower one of said arms E has an upwardly-extending limb, through which and the upward extension of the trusses C a fastening-bolt is passed. Cross-braces are secured to said arms E, forming a strong truss.

The curved arms F are joined at their top and bottom by the cross-bars H and J, respectively.

K designates a forwardly-projecting frame or scoop, which is pivoted to the arms F at L, said frame K consisting of the side members M, which are joined by the front and rear cross-bars N and N', to the former of which the rubber strip or buffer P is attached and projects forwardly therefrom, the said frame K being covered with canvas or other suitable material.

Q designates connections leading from said cross-bar H to the forward extremity of the frame or scoop K, each of said connections being provided with a turnbuckle R or other suitable adjusting devices, whereby the height of said frame K from the track can be readily adjusted according to requirements.

S designates a roller mounted upon suitable journals underneath the frame K.

T designates a suitable netting, which is attached to the cross-bars H and J and the arms F, whereby a cradle or pocket T' is formed, which is adapted to receive the object or thing struck.

U designates a cord, chain, or other connection which is adapted to assist in supporting the fender.

The operation is as follows: As the car progresses, if an object is struck, the same will be caught up by means of the scoop K no matter how small said object may be, and it will be thrown into the cradle T', formed between the side arms F of the fender, it being apparent that the scoop K can be adjusted so as to be but a short distance above the track, and I desire to call especial attention to the fact that by reason of mounting the fender upon the trusses C, and attaching the same to the truck, in the manner described, the vibrations of the body of the car will not be imparted to the fender in any degree, and I am thereby enabled to reduce to a minimum the distance between the buffer P and the track, and thus preclude any possibility of an object rolling beneath the fender and under the car, as is the case with a majority of the fenders now in use. The trusses consist of upper and lower bars with struts or strips connecting and bracing the same, forming skeleton structures, which are light, strong, and durable, they being secured to the truck, as has been stated, and projecting forward from the same, so as to support the fender in front of the platform and dasher of the car, where it is most serviceable, the trusses also serving to maintain the fender at all times close to the track or road-bed without materially changing the level thereof.

It will further be apparent that in practice the trucks B may be located nearer the center of the car than shown in Fig. 2, in which instance the length of the trusses C will be correspondingly lengthened.

When economy of space is desired, it is only necessary to turn the frame K upwardly upon the pivotal points L, said frame then resting upon the arms F of the fender G.

It will of course be apparent that various changes may be made in the manner of mounting and assembling the parts which will come within the scope of my invention, and I do not therefore desire to be limited in every instance to the exact construction I have herein shown and described.

Having thus described my invention, what I claim as new, and desire to secure by Letters Patent, is—

1. A fender consisting of connected curved arms, each having two rearwardly-projecting arms, one of which is provided at its rear end with a hook, and the other at its rear end with a vertical limb, and braces secured to said arms, said parts being combined, substantially as described.

2. In a car-fender, a frame, rearwardly-projecting arms rigidly connected therewith, an upper one of said arms having at its rear end a hook for engagement with a cross-bar supported upon a car-truck, and a lower arm provided at its rear end with a vertical limb adapted to be secured to a truss mounted on the car-truck, said parts being combined substantially as described.

3. A car-fender consisting of the curved sides F, having the cross-bars J and H, a forwardly-projecting frame having side members M pivoted to said sides F, and cross-bars N, N', with the buffer P, and the upper and lower arms E projecting rearwardly from said sides F, the upper one of said arms E having a hook and the lower one having an upright limb, the latter and said hook being adapted to be supported from the car-truck, said parts being combined substantially as described.

4. A car-fender having a truss adapted to be attached to the truck of a car, and provided at its front end with an upwardly-extending limb, and a frame having on each of its sides two rearwardly-projecting arms suitably braced, one of which has a hook for engagement with a cross-bar on said truss and the other arm having an upright limb for connection with said truss, said parts being combined substantially as described.

WILLIAM P. YOUNG.

Witnesses:
WM. C. WIEDERSHEIM,
E. HAYWARD FAIRBANKS.